United States Patent [19]

Rodriguez

[11] Patent Number: 4,742,889
[45] Date of Patent: May 10, 1988

[54] PHONIC DEADENING DEVICE FOR CONDUIT OF SANITARY INSTALLATION

[75] Inventor: Jean-Jacques Rodriguez, Douvaine, France

[73] Assignee: Kugler, Fonderie et Robinetterie S.A., Geneva, Switzerland

[21] Appl. No.: 943,320

[22] Filed: Dec. 22, 1986

[30] Foreign Application Priority Data

Feb. 11, 1986 [CH] Switzerland ............... 00547/86

[51] Int. Cl.$^4$ ............................................... F16L 55/02
[52] U.S. Cl. ..................................... 181/233; 181/234; 138/28; 138/148
[58] Field of Search ................. 181/233, 234; 138/26, 138/28, 30, 113, 114, 148

[56] References Cited

U.S. PATENT DOCUMENTS

| | | | |
|---|---|---|---|
| 2,261,948 | 11/1941 | Beach | 181/233 |
| 2,495,693 | 1/1950 | Byrd, Jr. et al. | 181/233 X |
| 2,734,462 | 2/1956 | Schaefer | 138/28 X |
| 3,878,867 | 4/1975 | Dirks | 138/30 |
| 4,157,194 | 6/1979 | Takahashi | 138/113 X |

*Primary Examiner*—Benjamin R. Fuller

[57] ABSTRACT

The phonic deadening device comprises a cylindrical sleeve (5) with double walls, made of an elastic material and the axial traversing opening of which serves for the passage of the flux of the liquid. Both walls of this sleeve define between them an empty annular space (6), which is closed in a tight manner by an annular sealing element (7). This element further serves to position and to maintain the sleeve in a service position in the conduit.

13 Claims, 2 Drawing Sheets

PHONIC DEADENING DEVICE FOR CONDUIT OF SANITARY INSTALLATION

The present invention relates to a phonic deadening device for conduit of sanitary installation.

Sound deadening devices are already known, which are constituted for example by a segment of pipe made of elastic material, and intended to be inserted in a water conduit in order to oppose variations of pressure and/or acoustic vibrations caused by the passage of water. However the known devices present the drawback of necessitating tightness means which are expensive and complicated, such as ribbed joints, flanges with circular tightening edges at the ends of the segment, as well as supporting elements disposed outside the segment.

The purpose of this invention is to overcome the precited drawbacks of the known devices. The phonic deadening device according to the invention achieving the above purpose has the features defined in claim 1.

The annexed drawing shows schematically and by way of examples the phonic deadening device according to the invention.

Figure 1:
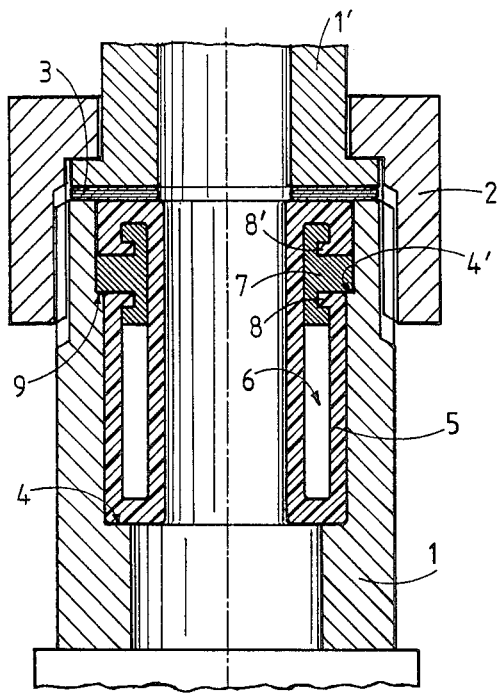
FIG. 1 is a longitudinal sectional view of a first embodiment in service position in a water conduit.
Figure 4:
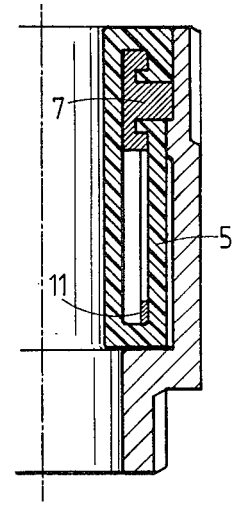
FIG. 4 is a longitudinal sectional view of a variant of FIG. 1.

In FIG. 1 is shown in section a portion of a conduit of a sanitary installation provided with a phonic deadening device according to the invention. The illustrated portion comprises two pipe elements 1, 1' connected to one with the other in a known manner by a nut 2 retained by the terminal edge of element 1' and screwed on a thread presented by the end of the other element 1. A sealing gasket 3 is disposed between both elements 1, 1'.

Figure 2:
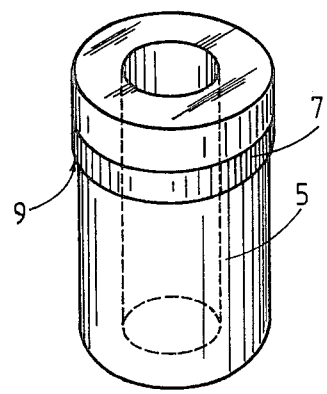
FIGS. 2 and 3 are respectively perspective and transverse sectional views of the device according to the first embodiment.

One of the elements 1 of the conduit shown has on its internal wall two circular shoulders 4, 4' intended to position and to retain the phonic deadening device incorporated within said conduit. As shown in FIGS. 1 and 2, a first realization of such a device consists of a cylindrical segment 5 with double walls made of an elastic material, such as rubber or any other plastic material having appropriate elasticity characteristics.

The double wall of the device 5 defines an empty annular gap 6, which is intended to deaden sounds outside the conduit which are due especially to the pressure variations of the liquid passing within said conduit. Of course, it is necessary that this empty annular gap 6 be completely tight with regards to the liquid passing within the conduit, otherwise the device could no longer ensure its deadening function. The device according to the invention requires only one sealing element. In the first embodiment of FIGS. 1 and 2, this sealing element is constituted by a metallic ring 7, presenting in sectional view the form of a sideways T, and presenting circular groves cooperating in service position with both edges 8, 8' of the circular opening situated near one of the ends of the cylindrical segment 5.

The external diameter of the metallic sealing ring 7 is slightly greater than the diameter of the cylindrical segment 5, in order to form an annular shoulder 9 cooperating in service position with the shoulder 4' of the internal wall of the element 1 of the pipe. The other end of the cylindrical segment 5, closed by manufacture, is laterally retained by the shoulder 4 of said internal wall.

Figure 3:
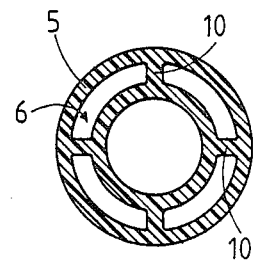

In order to improve the longitudinal support of the cylindrical segment 5, and thus avoid any risk that the deadening device be displaced or damaged by the passage of the liquid under pressure, it can comprise longitudinal stiffening ribs 10, made by manufacture with said segment 5 (FIG. 3), or one or several stiffening elements 11 disposed as braces in the empty annular gap 6.

Figure 5:
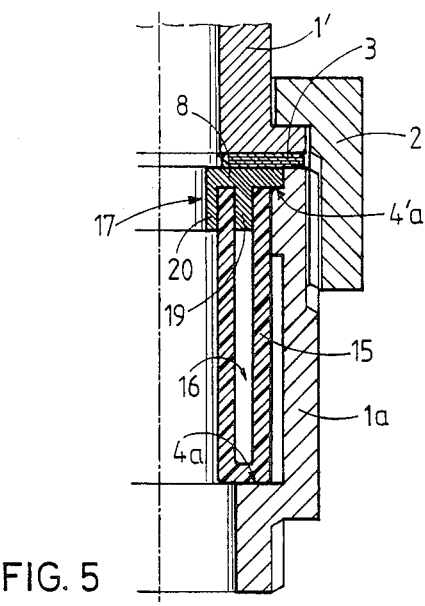
FIG. 5 is a longitudinal sectional view of a second embodiment in service position.
Figure 6:
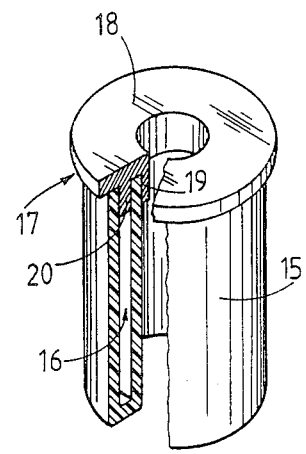
FIG. 6 is a perpective view partly in section of the device according to the embodiment of FIG. 5.

In the second embodiment of the phonic deadening device according to the invention, shown in FIGS. 5 and 6, the elastic cylindrical segment 15 presents in sectional view the form of a U, and is closed in a tight manner at its upper end by a metallic insert 17, in such a manner to form as before an empty annular gap 16, deadening the sounds. The metallic insert 17 comprises a centrally bored disc 18 and two circular walls perpendicular to the plane of this disc, one of them 19 delimiting the central hole permitting passage of the liquid and the other one 20 being force-fitted in service position between both walls of the cylindrical segment 15.

The pipe element 1a intended to receive in service position (FIG. 5) the phonic deadening device also presents two shoulders 4a, 4'a, cooperating in this service position respectively with the lower end, closed by manufacture, of the cylindrical segment 15, and with the external annular edge of the disc 18 of the metallic insert 17. Finally, the elastic cylindrical segment 15 can also present longitudinal stiffening ribs 21, 22, inside the empty annular gap 16, and/or outside said segment 15, these ribs being made by manufacture with said segment.

Figure 8:
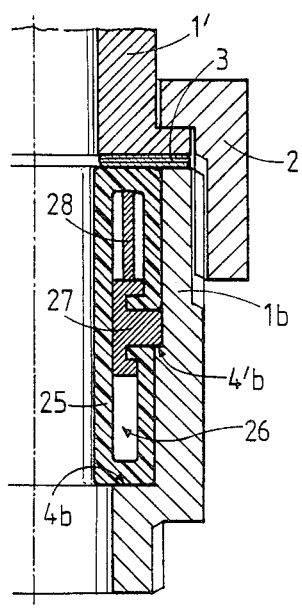
FIG. 8 is a longitudinal sectional view of a third embodiment in service position.
Figure 7:
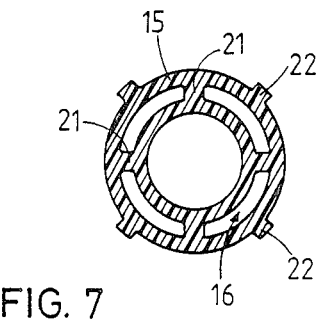
FIG. 7 is a transverse sectional view of a variant of the device according to the second embodiment.

With regards to the third embodiment, shown on FIG. 8, it is distinguished from the first embodiment shown in FIGS. 1 and 2, in that the metallic sealing ring 27 is disposed near the middle of the elastic cylindrical segment 25, the empty annular gap 26 being thus devided in two parts by said ring. Furthermore, the diameter of the upper portion of the segment 25 is slightly greater than that of the lower portion and corresponds to the external diameter of the ring 27. This latter forms, as in the first embodiment, an annular shoulder cooperating in the shown service position with the first annular shoulder 4'b which is presented by the internal wall of the pipe element 1b, a second shoulder presented by said wall serving as a support for the lower end of the cylindrical segment 25. One or several braces 28 can also be disposed in one or in both parts of the empty annular gap 26.

Of course, other embodiments of the cylindrical segment and of the tightening elements thereof can be forseen, inasmuch as said segment presents only one opening which could be closed in a tight manner, so as to efficiently isolate from the liquid passing in the conduit the empty gap formed between the walls of said segment, so as this latter may play its role of phonic deadening device.

What is claimed is:

1. A device for deadening noise generated by passage of fluid through a tubular conduit, comprising: a tubular elastic element having first and second ends and a central axial opening passing therethrough, an inner cylindrical wall defining said axial opening, an outer cylindrical wall spaced from an concentric and coextensive with said inner wall, first and second annular end elements each sealingly interconnecting said inner and outer cylindrical walls at said first and second ends, respectively, thereby to define an annular air space delimited by said first and second ends and said inner and outer cylindrical walls, said outer cylindrical wall being interrupted, intermediate said first and second ends, by a circumferential, radially inwardly extending annular opening communicating with said annular airspace; and a rigid annular sealing member concentrically confined in said annular airspace, said sealing member having a radially outwardly extending portion disposed in said annular opening.

2. Device according to claim 1, wherein said annular opening divides said outer cylindrical wall into upper and lower portions, said upper portion being thicker than said lower portion; said radially outwardly extending portion of said sealing member lying flush with said upper portion and projecting radially outwardly beyond said lower portion.

3. Device according to claim 1, wherein said rigid annular sealing member abuts said first annular end element.

4. Device according to claim 3, and stiffening ribs disposed in said annular airspace and extending axially between said rigid annular sealing member and said second annular end element.

5. Device according to claim 4, wherein said stiffening ribs are formed integrally with said tubular elastic element.

6. Device according to claim 2, wherein said annular opening is formed equidistant said first and second ends, said upper and lower portions of said outer cylindrical wall thereby having an identical axial extent.

7. Device according to claim 6, and stiffening ribs disposed in said annular airspace and extending axially between said rigid annular sealing member and one of said first and second ends.

8. Device according to claim 7, wherein said stiffening ribs are formed integrally with said tubular elastic element.

9. Device according to claim 1, and axially extending stiffening ribs formed integrally on said outer cylindrical wall and projecting radially outwardly therefrom.

10. Device according to claim 1, in combination with a tubular conduit for passage of fluid, said device being disposed coaxially inside said conduit.

11. Device according to claim 10, wherein said conduit has a first internal diameter, a second internal diameter less than said first internal diameter and separated therefrom by a radial shoulder, said second internal diameter corresponding to the external diameter of said tubular elastic element, whereby said second end of said tubular elastic element rests on and is compressed against said radial shoulder.

12. Device according to claim 2, in combination with a tubular conduit for passage of fluid, said device being disposed coaxially inside said conduit, said conduit having a first internal radial shoulder against which said second end of said tubular elastic element rests, and a second internal radial shoulder against which said radially outwardly extending portion of said rigid annular sealing member rests.

13. Device according to claim 1, wherein said tubular elastic element is of one-piece construction.

* * * * *